United States Patent
Huang

(12) 
(10) Patent No.: US 6,470,575 B2
(45) Date of Patent: Oct. 29, 2002

(54) FORCE-SAVING PRUNER WITH A GUIDING ROLLER ARRANGEMENT

(76) Inventor: Feng Huang, No. 188, Section 2, Lu Dong Road, Lu Gang Chen, Chang Hua Hsien (TW)

( * ) Notice: Subject to any disclaimer, the term of this patent is extended or adjusted under 35 U.S.C. 154(b) by 0 days.

(21) Appl. No.: 09/877,357

(22) Filed: Jun. 8, 2001

(65) Prior Publication Data

US 2002/0000044 A1 Jan. 3, 2002

(30) Foreign Application Priority Data

Jun. 30, 2000 (TW) ..................................... 89211395 U

(51) Int. Cl.$^7$ ............................................... B26B 13/00
(52) U.S. Cl. ......................................... 30/250; 30/188
(58) Field of Search .......................... 30/250, 188, 187, 30/249

(56) References Cited

U.S. PATENT DOCUMENTS

| 113,670 | A | * | 4/1871 | Howell | 30/250 |
| 2,385,835 | A | * | 10/1945 | Neal | 30/250 |
| 4,058,893 | A | * | 11/1977 | Boyajian | 30/250 |
| 4,249,308 | A | * | 2/1981 | Boyajian | 30/250 X |

* cited by examiner

Primary Examiner—Douglas D. Watts
(74) Attorney, Agent, or Firm—Alan D. Kamrath; Rider, Bennett, Egan & Arundel

(57) ABSTRACT

A pruner comprises a first handle comprising a jaw on a first end thereof and a handle portion on a second end thereof, a second handle having an end pivotally mounted to the first handle, a first roller and a second roller rotatably mounted in the second handle and each including an outer periphery, and a cutter comprising a first end that cooperates with the jaw for performing a cutting function and a second end having a sliding portion. The cutter has an intermediate portion pivotally connected to the intermediate portion of the first handle. A portion of the outer periphery of the first roller and a portion of the outer periphery of the second roller are located in the moving path of the sliding portion of the cutter for guiding the sliding portion of the cutter during relative pivotal movement between the first handle and the second handle.

20 Claims, 6 Drawing Sheets

FORCE-SAVING PRUNER WITH A GUIDING ROLLER ARRANGEMENT

BACKGROUND OF THE INVENTION

1. Field of the Invention

The present invention relates to a force-saving pruner that utilizes a guiding roller arrangement to accomplish cutting of an object by one cut.

2. Description of the Related Art

FIG. 1 of the drawings illustrates a conventional pruner comprising a first handle 10 and a second handle 11 that are pivoted together at a pivot 12. A jaw 13 is formed on an end of the first handle 10 and includes a hollow mediate portion through which a cutter 14 is extended. The cutter 14 includes a first end for performing a cutting operation together with the jaw 13 and includes a second end having a slot 17. A transverse member 15 includes a first end 16 slidably received in the slot 17 and a second end to which an end of a spring 18 is attached, the other end of the spring 18 being attached to the cutter 14. Thus, when the first and second handles 10 and 11 are pivoted relative to each other, the cutter 14 is moved, and the first end 16 of the transverse member 15 translates along the slot 17.

The first end 16 of the transverse member 15 in FIG. 1 is located in an end of the slot 17 before cutting. When the user applies a force to move the first and second handles 10 and 11 toward each other, the cutter 14 cuts an object 19 between the cutter 14 and the jaw 13 by about one-third (⅓) of the object 19, as illustrated in FIG. 2, yet it is difficult to continue cutting in this state. The user must move the first and second handles 10 and 11 slightly away from each other for the next cutting. The cutting procedure repeats until the object 19 is completely cut, while the first end 16 of the transverse member 15 is moved to the other end of the slot 17, as illustrated in FIG. 3. Thus, a force-saving operation is provided during pruning. However, it takes at least two cutting operations to completely cut the object to be cut, and each time the user must move the handles 10 and 11 away from each other for the next cutting. The cutting operation is inconvenient and time consuming. The end face of the object after cutting is not flush.

SUMMARY OF THE INVENTION

It is the primary object of the present invention to provide a force-saving pruner that utilizes a guiding roller arrangement to accomplish cutting of an object by one cut.

In a preferred embodiment of the invention, a pruner comprises a first handle comprising a jaw on a first end thereof and a handle portion on a second end thereof, a second handle having an end pivotally mounted to the first handle, a first roller and a second roller rotatably mounted in the second handle and each including an outer periphery, and a cutter comprising a first end that cooperates with the jaw for performing a cutting function and a second end having a sliding portion. The cutter has an intermediate portion that is pivotally connected to the intermediate portion of the first handle.

The sliding portion of the cutter moves along a path during relative pivotal movement between the first handle and the second handle. A portion of the outer periphery of the first roller and a portion of the outer periphery of the second roller are located in the moving path of the sliding portion of the cutter for guiding the sliding portion of the cutter during the relative pivotal movement between the first handle and the second handle.

The portion of the outer periphery of each of the first roller and the second roller is beyond an inner side of the second handle. The outer periphery of each of the first roller and the second roller comprises an annular groove defined therein. The sliding portion of the cutter is in contact with at least one of a bottom wall defining the annular groove of the first roller and a bottom wall defining the annular groove of the second roller. Cutting of an object between the first end of the cutter and the jaw of the first handle is accomplished by one cut.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
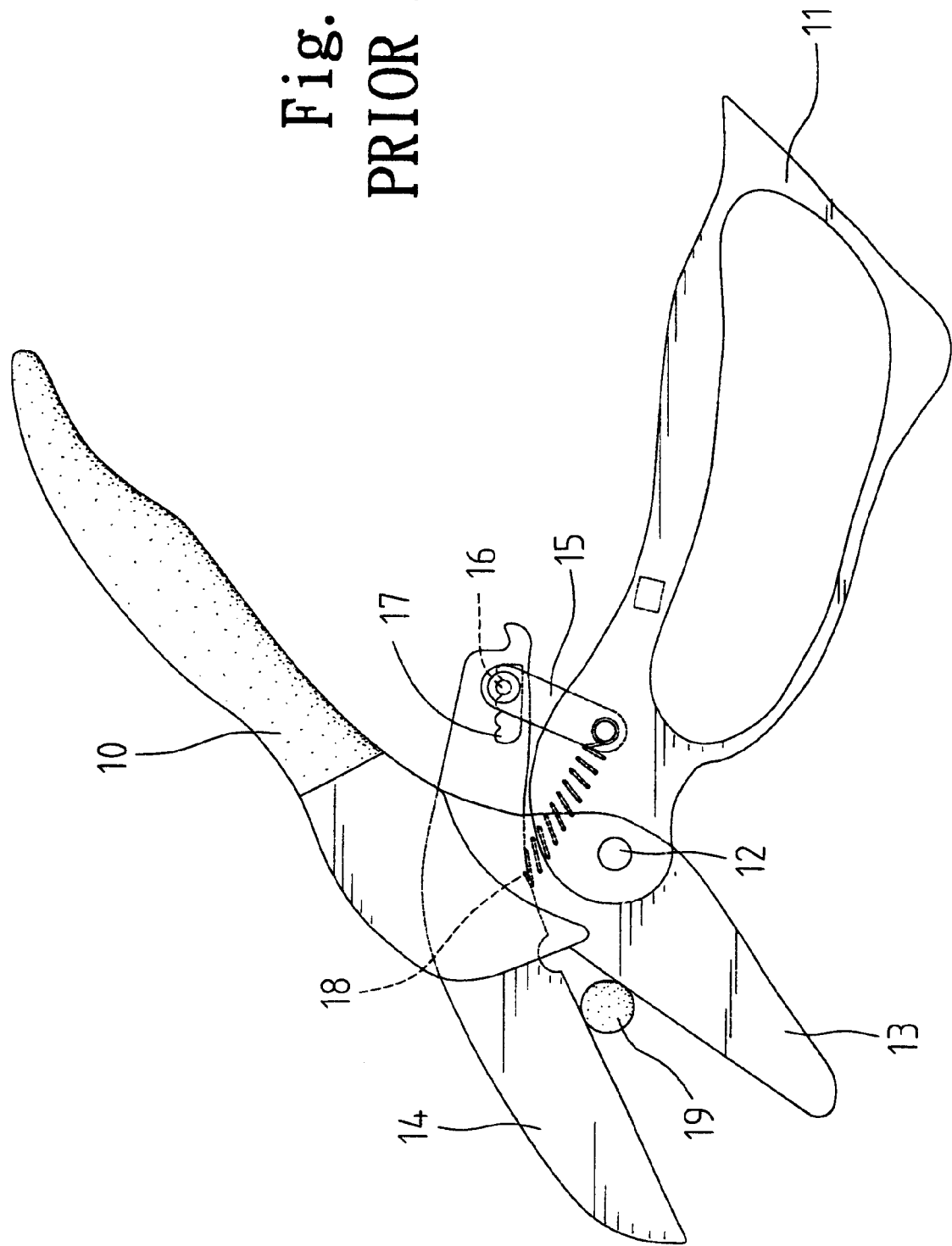
FIG. 1 is a plan view of a conventional pruner.
Figure 2:
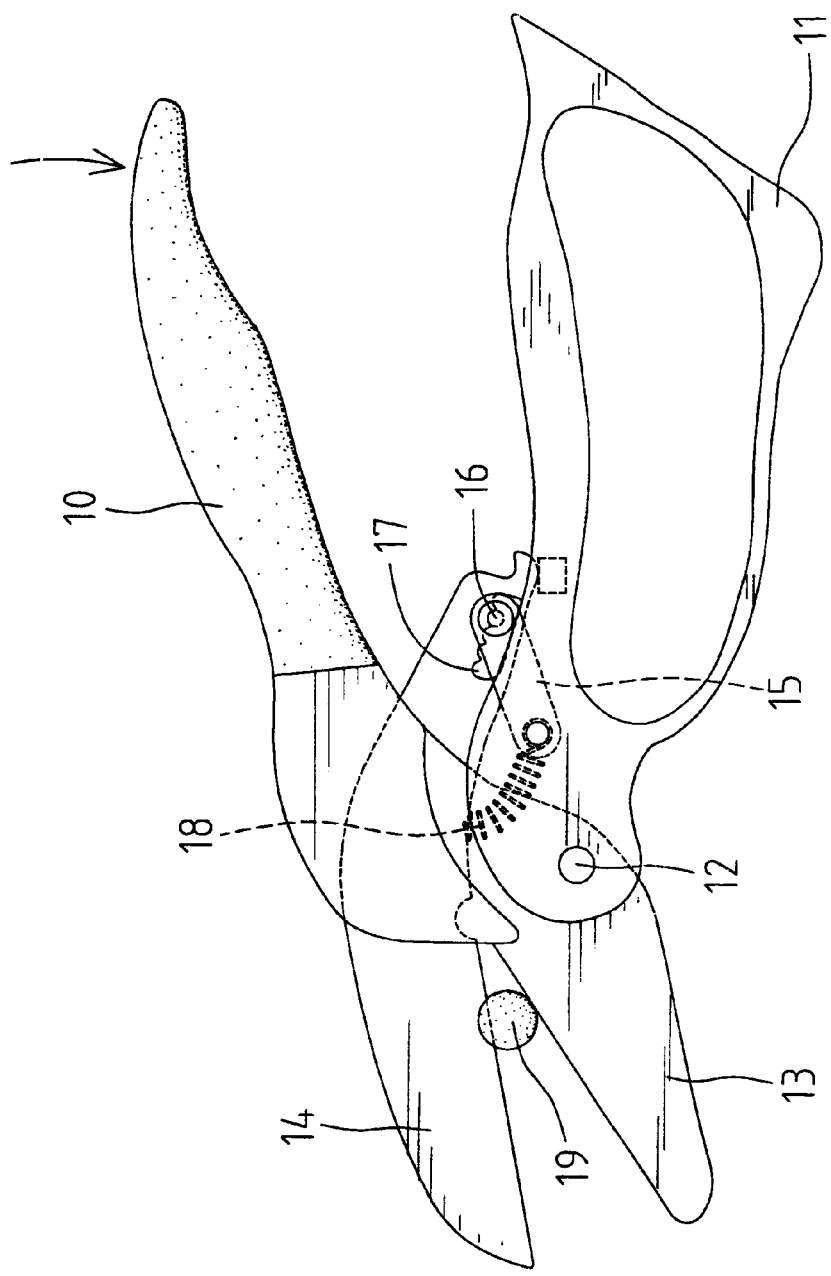
FIG. 2 is a plan view similar to FIG. 1, illustrating a first stage cutting operation of the conventional pruner.
Figure 3:
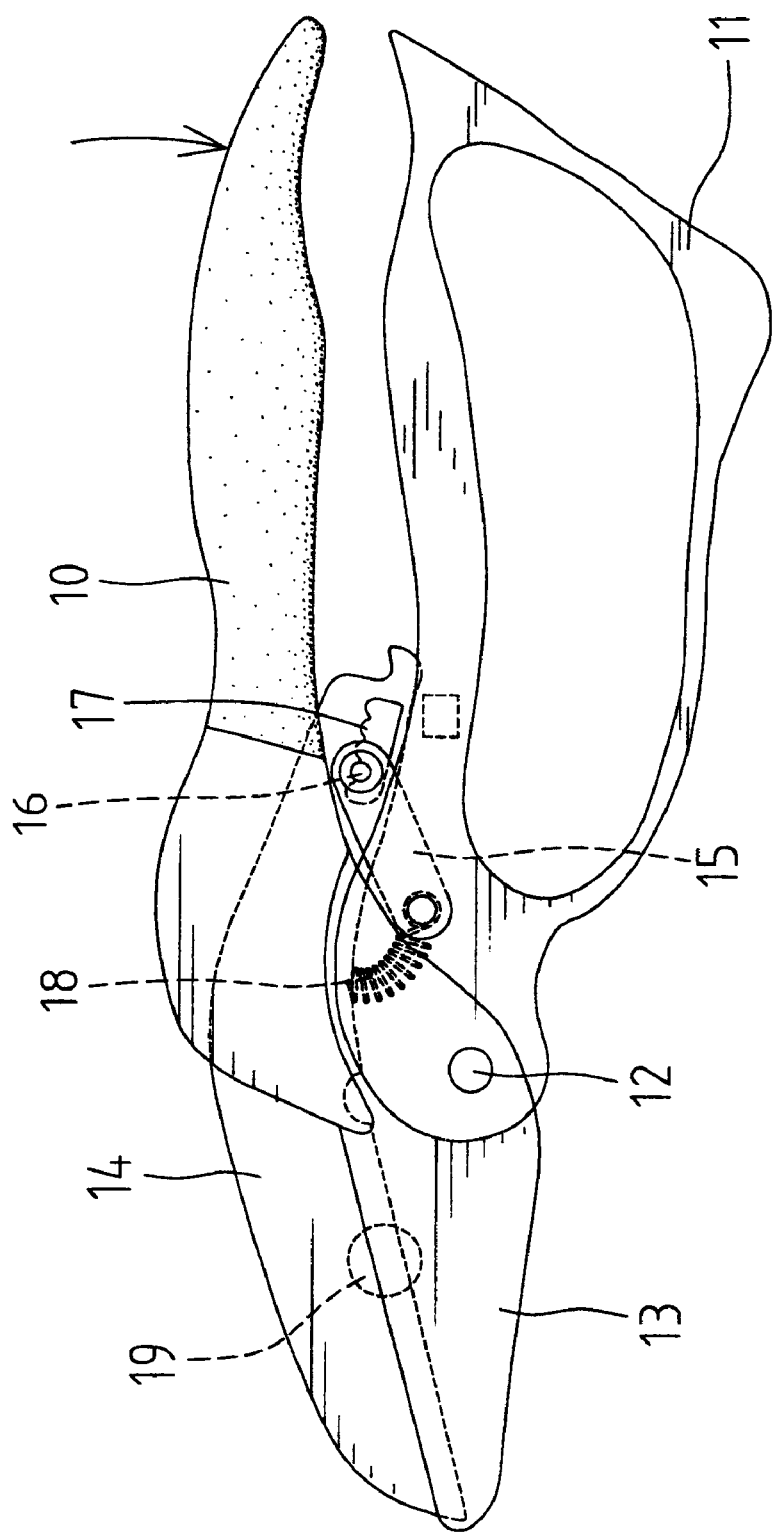
FIG. 3 is a plan view similar to FIG. 1, illustrating a second stage cutting operation of the conventional pruner.
Figure 4:
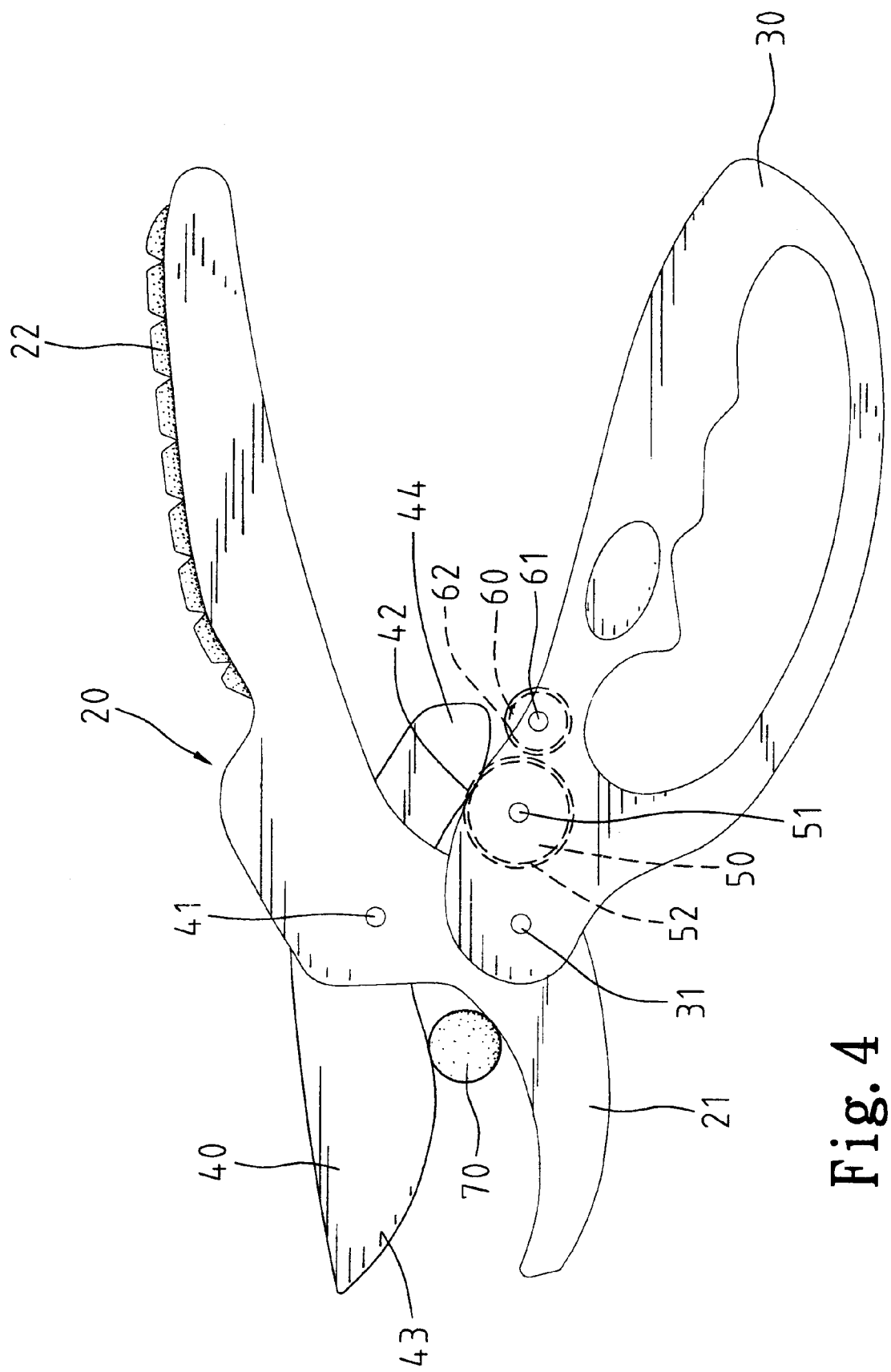
FIG. 4 is a plan view of a pruner in accordance with the present invention.
Figure 5:
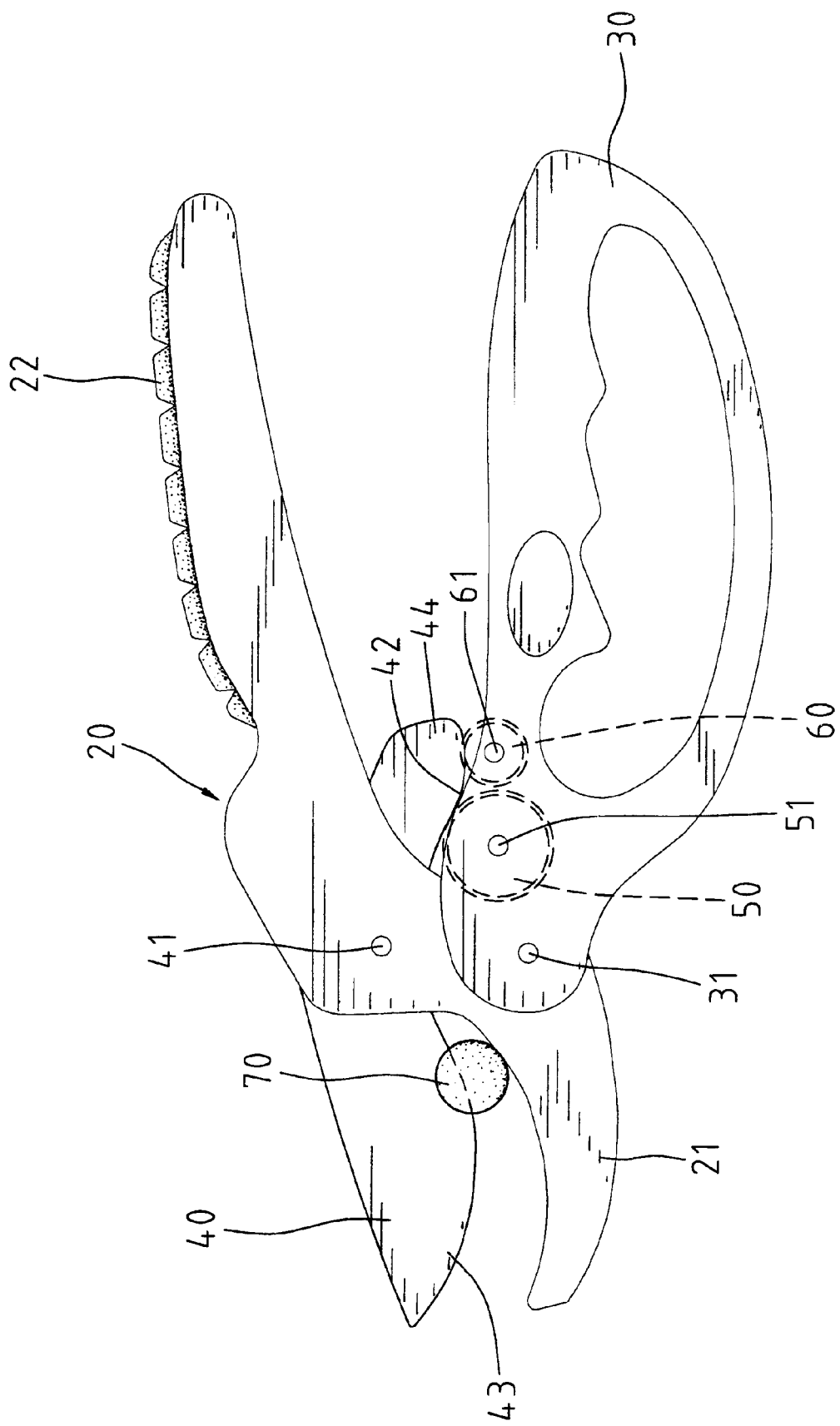
FIG. 5 is a plan view similar to FIG. 4, illustrating a first stage cutting operation of the pruner in accordance with the present invention.

Referring to FIG. 5, a pruner in accordance with the present invention generally comprises a first handle 20, a second handle 30, a cutter 40, and a guiding roller arrangement 50 and 60. The first handle 20 comprises a jaw 21 on a first end thereof and a handle portion 22 on a second end thereof. The second handle 30 comprises an end 31 pivotally connected to the first handle 20 at a point adjacent to an outer side of the jaw 21.

The cutter 40 is pivotally connected to an intermediate portion of the first handle 20 at axis 41 and includes a first end 43 that cooperates with the jaw 21 for performing a cutting function and a second end 44 having a sliding portion 42. In this embodiment, the intermediate portion of the first handle 20 is hollow and thus allows the cutter 40 to extend therethrough.

The guiding roller arrangement comprises at least one roller rotatably mounted in the second handle 30. In this embodiment, the guiding roller arrangement comprises a first roller 50 and a second roller 60. The first roller 50 is rotatably mounted in the second handle 30 at axis 51 and includes an annular groove 52 in an outer periphery thereof The second roller 60 is rotatably mounted in the second handle 30 at axis 61 and includes an annular groove 62 in an outer periphery thereof Each of the annular groove 52 of the first roller 50 and the annular groove 62 of the second roller 60 has a portion beyond an inner side of the second handle 30 and located along a moving path of the sliding portion 42 of the cutter 40 during relative pivotal movement between the first handle 20 and the second handle 30.

Figure 6:
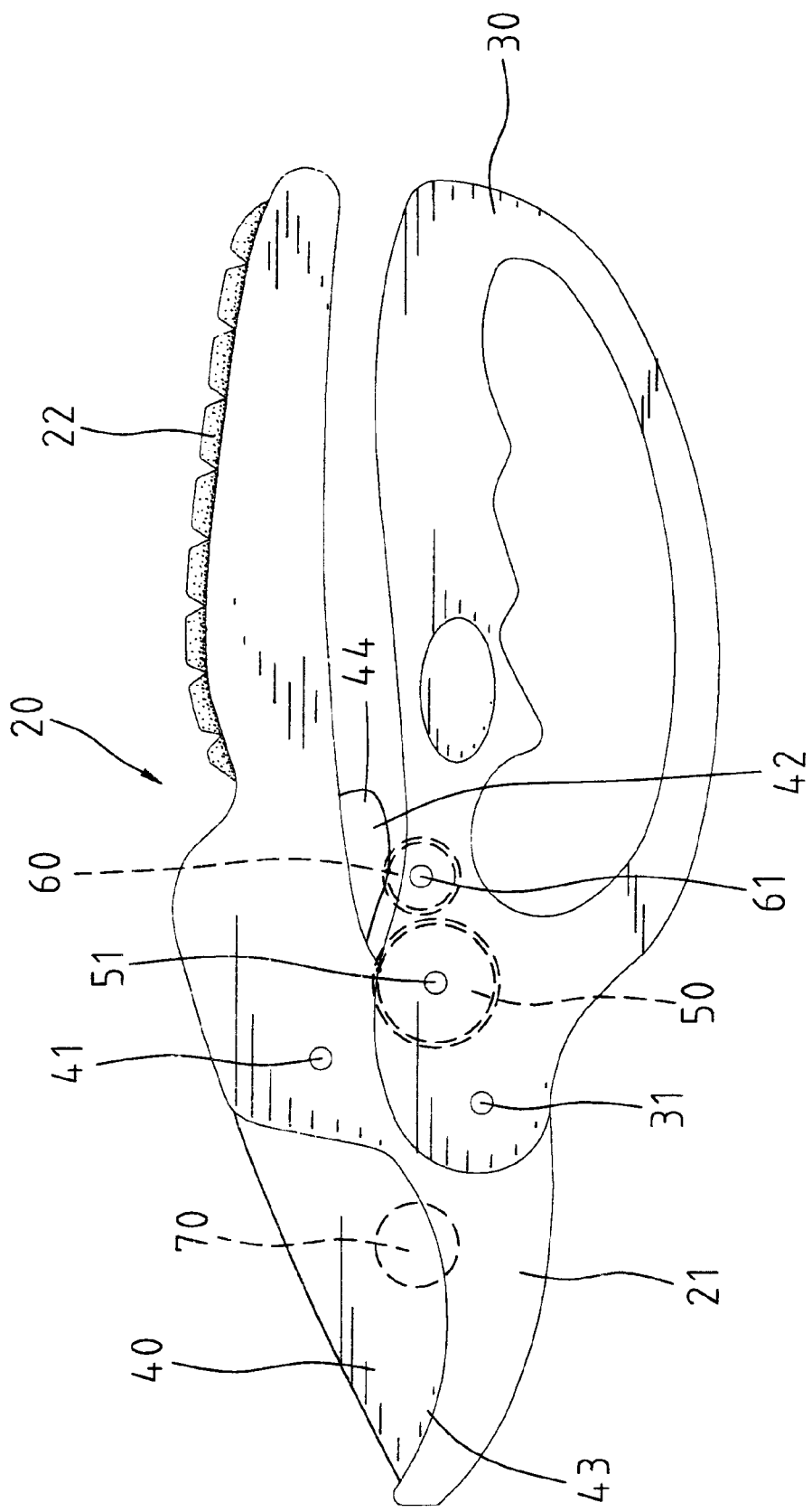
FIG. 6 is a plan view similar to FIG. 4, illustrating a second stage cutting operation of the pruner in accordance with the present invention.

In use, an object 70 to be cut is placed between the first end 43 of the cutter 40 and the jaw 21 of the first handle 20. The sliding portion 42 of the cutter 40 is received in the annular groove 52 of the first roller 50 and in contact with a bottom wall defining the annular groove 52. Next, the user applies a force to pivot the first handle 20 and the second handle 30 toward each other. The object 70 is cut by the first end 43 of the cutter 40 by about one-third (⅓), while a portion of the sliding portion 42 of the cutter 40 slides into the annular groove 62 of the second roller 60 and comes in contact with a bottom wall defining the annular groove 62, best shown in FIG. 5. In this case, the user is allowed to continue applying a force to further pivot the first handle 20 and the second handle 30 toward each other, as shown in FIG. 6. The sliding portion 42 of the cutter 40 disengages from the first roller 50 and is completely moved into and thus guided by the annular groove 62 of the second roller 60. Thus, complete cutting can be accomplished by one cut. The first roller 50 and the second roller 60 rotate freely during operation, thereby allowing movement of the sliding portion 42 of the cutter 40 from one roller to the other.

According to the above description, the repeated cutting operations for cutting an object as required in the conventional pruner is eliminated by the pruner in accordance with the present invention. The operation of the pruner in accordance with the present invention is force-saving and simple by providing a one-cut operation. The end face of the object after cutting is flush.

What is claimed is:

1. A pruner comprising:
   a first handle comprising a jaw on a first end thereof, an intermediate portion, and a handle portion on a second end thereof;
   a second handle having an end pivotally mounted to the first handle;
   at least one roller rotatably mounted in the second handle and including an outer periphery; and
   a cutter comprising a first end that cooperates with the jaw for performing a cutting function and a second end having a sliding portion, the cutter having an intermediate portion that is pivotally connected to the intermediate portion of the first handle;
   the sliding portion of the cutter moving along a path during relative pivotal movement between the first handle and the second handle, a portion of the outer periphery of said at least one roller being located in the moving path of the sliding portion of the cutter for guiding the sliding portion of the cutter during the relative pivotal movement between the first handle and the second handle.

2. The pruner as claimed in claim 1, wherein the portion of the outer periphery of said at least one roller is beyond an inner side of the second handle.

3. The pruner as claimed in claim 1, wherein the outer periphery of said at least one roller comprises an annular groove defined therein.

4. The pruner as claimed in claim 3, wherein the sliding portion of the cutter is in contact with a bottom wall defining the annular groove of said at least one roller.

5. The pruner as claimed in claim 2, wherein the outer periphery of said at least one roller comprises an annular groove defined therein.

6. The pruner as claimed in claim 5, wherein the sliding portion of the cutter is in contact with a bottom wall defining the annular groove of said at least one roller.

7. The pruner as claimed in claim 1, wherein cutting of an object between the first end of the cutter and the jaw of the first handle is accomplished by one cut.

8. A pruner comprising:
   a first handle comprising a jaw on a first end thereof, an intermediate portion, and a handle portion on a second end thereof;
   a second handle having an end pivotally mounted to the first handle;
   a first roller and a second roller rotatably mounted in the second handle and each including an outer periphery; and
   a cutter comprising a first end that cooperates with the jaw for performing a cutting function and a second end having a sliding portion, the cutter having an intermediate portion that is pivotally connected to the intermediate portion of the first handle;
   the sliding portion of the cutter moving along a path during relative pivotal movement between the first handle and the second handle, a portion of the outer periphery of the first roller and a portion of the outer periphery of the second roller being located in the moving path of the sliding portion of the cutter for guiding the sliding portion of the cutter during the relative pivotal movement between the first handle and the second handle.

9. The pruner as claimed in claim 8, wherein the portion of said outer periphery of each of the first roller and the second roller is beyond an inner side of the second handle.

10. The pruner as claimed in claim 8, wherein the outer periphery of each of the first roller and the second roller comprises an annular groove defined therein.

11. The pruner as claimed in claim 10, wherein the sliding portion of the cutter is in contact with at least one of a bottom wall defining the annular groove of the first roller and a bottom wall defining the annular groove of the second roller.

12. The pruner as claimed in claim 9, wherein the outer periphery of each of the first roller and the second roller comprises an annular groove defined therein.

13. The pruner as claimed in claim 12, wherein the sliding portion of the cutter is in contact with at least one of a bottom wall defining the annular groove of the first roller and a bottom wall defining the annular groove of the second roller.

14. The pruner as claimed in claim 8, wherein cutting of an object between the first end of the cutter and the jaw of the first handle is accomplished by one cut.

15. The pruner as claimed in claim 8, with the first and second rollers being positioned so that the sliding portion of the cutter is initially guided by the first roller and is spaced from the second roller, then is guided by both the first and second rollers, and then is guided by the second roller and is spaced from the first roller when performing the cutter function.

16. The pruner as claimed in claim 15, with the first roller having an axis and the second roller having an axis spaced from and parallel to the axis of the first roller, with the sliding portion not extending through a plane including the axes of the first and second rollers during the cutting function.

17. The pruner as claimed in claim 15, with the sliding portion including a first part and a second part extending at an obtuse angle to the first part, with the first part of the sliding portion engaging the outer periphery of the first roller and the second part of the sliding portion engaging the outer periphery of the second roller in a portion of the path and with the first part of the sliding portion becoming radially spaced from the outer periphery of the first roller when the outer periphery of the second roller moves from the second part to the first part of the sliding portion.

18. The pruner as claimed in claim 8, with the first roller having an axis and the second roller having an axis spaced from and parallel to the axis of the first roller, with the sliding portion not extending through a plane including the axes of the first and second rollers during the cutting function.

19. The pruner as claimed in claim 8, with the sliding portion including a first part and a second part extending at an obtuse angle to the first part, with the first part of the sliding portion engaging the outer periphery of the first roller and the second part of the sliding portion engaging the outer periphery of the second roller in a portion of the path and with the first part of the sliding portion becoming radially spaced from the outer periphery of the first roller when the outer periphery of the second roller moves from the second part to the first part of the sliding portion.

20. The pruner as claimed in claim 8, with the second handle being pivotably mounted to the first handle at an axis, with the first and second rollers being rotatably mounted in the second handle on a radial side of the axis, with the sliding portion of the cutter extending on the radial side beyond the axis of the first and second handles.

* * * * *